April 17, 1956  C. F. JOHNSON  2,741,938
THREADLESS BOLT AND RESILIENT RETAINER THEREFOR
Filed March 1, 1954
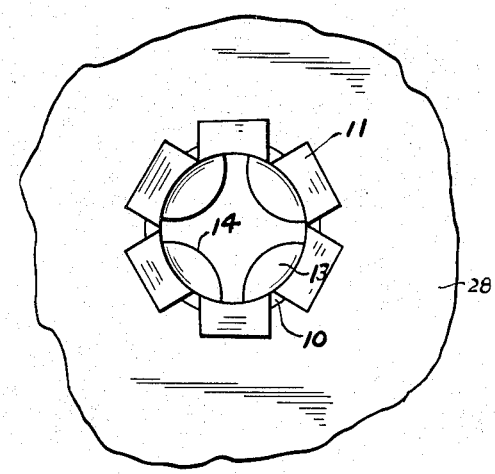
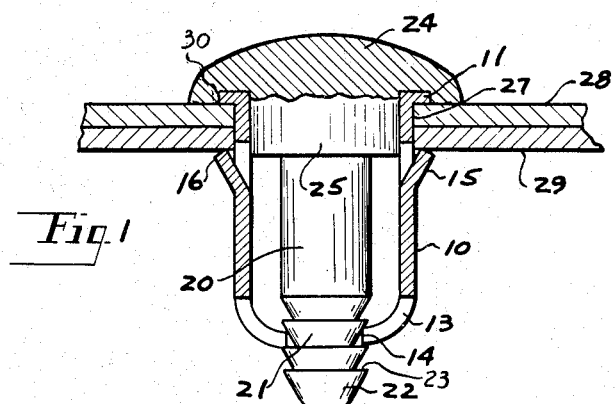
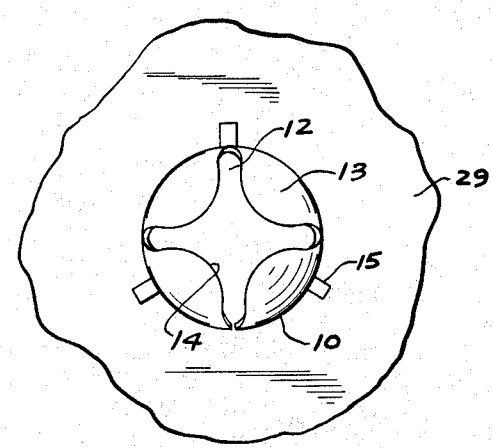
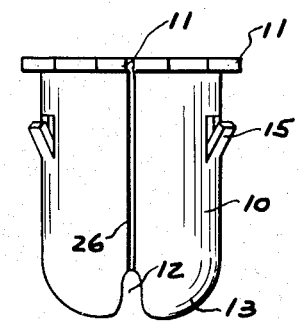
INVENTOR.
CLYDE F. JOHNSON
BY Louis Chayka
ATTORNEY

United States Patent Office 2,741,938
Patented Apr. 17, 1956

2,741,938
THREADLESS BOLT AND RESILIENT RETAINER THEREFOR

Clyde F. Johnson, Detroit, Mich.

Application March 1, 1954, Serial No. 413,002

1 Claim. (Cl. 85—8.8)

The fastener is of a type which may be used to connect two or more sheets or plates to each other by being thrust through alined apertures in the sheets or plates, as the case may be.

The object of the invention is to provide a fastener which, being provided with a head portion, may be quickly inserted into the apertures by a single operation, specifically, by a thrust upon said head to force the fastener endwise into said apertures, and which, once inserted thereinto, will stay in place without any further adjustment and without any possibility of a spontaneous disengagement.

As the fastener is made in part of sheet metal stock, the object of the invention is to provide a fastener including a solid core, in order to reinforce it, specifically, the stem portion thereof, against shearing stresses directed against it at right angle to the axis of said fastener.

A still further object of the invention is to provide a fastener of simple structure and one that may be produced economically, but yet will be fully practical and efficient in its operative use.

I shall now describe my fastener with respect to the accompanying drawings in which:

Fig. 1 is a vertical sectional view of the fastener as applied to two sheet members to be joined to each other;

Fig. 2 is a side elevational view of one element of said fastener;

Fig. 3 is a top elevational view of the element shown in Fig. 2, the view including a part of a sheet to which said element has been operatively applied;

Fig. 4 is the bottom view of said element shown in Fig. 2, the view including a portion of a sheet member to which the element has been applied from the opposite side.

Similar numerals refer to similar parts throughout the several views.

The fastener is made of two complementary parts. One of them, shown in Fig. 2, is made out of a blank of sheet steel or some other metal, preferably one characterized by spring-like resiliency. It is a cylindrical element 10 split longitudinally and open at both ends. At one end it includes a plurality of integrally-formed flat fingers 11 radially extending from the body, that is, the wall of the element. If preferred, a continuous, annular flange may be substituted for the plurality of fingers.

At the opposite end the cylindrical element is bent into a cup-shaped formation without being closed at that end, and is cut vertically by a plurality of slots 13 so that, as a result thereof, the wall of the cylinder at that end has been converted into a plurality of claws 13. The ends 14 of the respective claws are disposed in substantially-horizontal positions in opposed relation to each other, but leaving between their outer ends sufficient space for reception of the complementary member to which I shall presently refer. As the claws are resilient, they will, when actuated from the space between their outer ends, spread apart, permitting engagement with said complementary member which is included in the view shown in Fig. 1.

Struck out from the body of the cylindrical element are a plurality of outwardly-flaring prongs 15, the ends 16 thereof being in opposed but spaced relation to said fingers 11.

To conclude the description of said cylindrical element, I wish to add that numeral 26 indicates the edges of the blank out of which the cylindrical element has been formed. The edges are normally spaced from each other, allowing diametrical compression of said cylindrical element in the course of its insertion into the apertures into which it is to fit.

The member included in Fig. 1 and forming the complementary element of my fastener has the shape of a bolt, including a shank 20, the lower portion of which is provided with a plurality of annular serrations 21, and terminates with a cone-like member 22. The serrations are preferably of the kind illustrated in the drawings, each of the serrations being defined in part by a flat, annular shoulder 23 in a plane at right angle to the axis of said bolt.

At the opposite end, the bolt includes a mushroom-type head 24 and a thick, circular body portion 25, disposed directly under said head, which is provided with an annular groove 30 skirting said portion 25. The body is of a diameter to fit into the upper portion of the cylindrical member 10. The length of the bolt from the underside of the head to its outer end is in excess of the length of the cylindrical element to permit engagement of the claws 13 of said element with the shoulder 23 of one of the serrations of the bolt, as shown in Fig. 1

Assuming that the fastener is to be used for the purpose of joining two plates 36 and 37, each of them being provided with a circular aperture 38, and that the apertures are alined, it may be possible in some cases to employ only the cylindrical element for that purpose. In such a case, the fastener, that is, the cylindrical element, is thrust into the alined apertures endwise, the end including the claws 13 entering said apertures first.

During the passage through the apertures, the lateral prongs 15 will be deflected towards the body of said element but will immediately spring outwardly on having passed through said apertures, whereupon the ends of the prongs will bear against the undersurface of the lower plate 37. While under the lower surface of the plate 29, the prongs will prevent the withdrawal of the cylindrical member 10.

When the matter of strength transversely to the axis of the fastener is involved, the two elements, that is, the cylindrical element and the bolt, may be used as a unit. In such a case, the cylindrical member is first inserted into the alined apertures in sheets or plates to be joined, whereupon the bolt is thrust into said cylindrical member till the outer end thereof becomes engaged by the claws 13 of said cylindrical member, in the manner shown in Fig. 1.

The fingers 11 on the top surface of plate 28 will fit into the annular groove 30 in the underside of head 24. The marginal portion of the head itself will bear against the upper surface of said plate and will force it into a more intimate contact with the lower plate, while the claws 13, engaging with the serrations in the lower portion of the bolt, will prevent the displacement of the latter. Thus, the head and the fingers acting from one direction against said plate, and the prongs 15 acting upon said plates from the opposite direction, will serve as a clamp first to draw the plates towards each other, to hold them in such a position, and to prevent buckling thereof.

It will be understood that some changes may be made in the structure of my fastener without departing beyond the range of equivalents of the features disclosed herein.

What I, therefore, wish to claim is as follows:

A fastener for securing a plurality of apertured plate-like members together comprising in combination, a thin cylindrical spring metal body member having a longitudinal slit in its wall to allow diametrical compression of said body member, said body member adapted to extend through the registering apertures in said plate-like members, a plurality of fingers extending radially outwardly from the upper end of the cylindrical body member and adapted to engage the upper face of the uppermost plate-like member, a plurality of spring prongs struck out from the intermediate portion of the body member and disposed obliquely and upwardly, the free ends of said prongs adapted to engage the bottom face of the lowermost plate-like member when the cylindrical body member is positioned in the openings in said plate-like members, inwardly directed spaced apart claws having free ends formed on the lower end of the cylindrical body member, the free ends of the claws being disposed horizontally and coacting to form a restricted opening in the lower end of the cylindrical body member, and a bolt for disposition through the apertured plate-like members and the cylindrical body member, said bolt including a shank portion having annular serrations formed adjacent its lower end, the serrations on the bolt being formed with downwardly, inwardly extending side faces forming an acuate angle with the axis of the bolt and a flat upper face joined therewith and extending substantially normal to the axis of the bolt, the lower end portion of the bolt adapted for disposition through the restricted opening formed in the lower end of the cylindrical body member, the horizontal portions of said claws adapted to engage an adjacent annular serrated portion of the shank of the bolt to prevent the withdrawal of the latter from the cylindrical member and the apertured plate-like members, an enlarged portion formed on the shank of the bolt adjacent its upper end for snug sliding fit within the upper end portion of the cylindrical body member, said enlarged portion being cylindrical and being of substantially the same diameter as the inner diameter of the body member at the point of contact with the plate-like members, and a head formed on the upper end of the bolt engaging the upper face of the uppermost plate-like member when the claws are in engagement with the serrated portion of the bolt, said head having an annular groove in its under side to receive the radially extending fingers on the upper end of the cylindrical body member.

References Cited in the file of this patent

UNITED STATES PATENTS

| | | |
|---|---|---|
| 947,602 | Stahl et al. | Jan. 25, 1910 |
| 2,244,976 | Tinnerman | June 10, 1941 |
| 2,244,977 | Hansman et al. | June 10, 1941 |
| 2,387,468 | Ritzel | Oct. 23, 1945 |